United States Patent [19]

Nicholson

[11] Patent Number: 4,819,293

[45] Date of Patent: Apr. 11, 1989

[54] ADAPTER AND POLE ASSEMBLY

[75] Inventor: Donald Nicholson, Canoga Park, Calif.

[73] Assignee: Aquality, Inc., Chatsworth, Calif.

[21] Appl. No.: 142,175

[22] Filed: Jan. 11, 1988

[51] Int. Cl.$^4$ .......................... F16D 1/10; F16B 7/10

[52] U.S. Cl. .......................................... 15/172; 15/1.7; 15/23; 15/144 R; 15/180; 16/115; 403/109

[58] Field of Search ...................... 15/172, 144 R, 1.7, 15/176, 171, 179, 180, 23, 28; 16/115; 403/109, 319, 92

[56] References Cited

U.S. PATENT DOCUMENTS

| | | | |
|---|---|---|---|
| 555,854 | 3/1896 | Davenport | 15/144 R |
| 1,442,362 | 7/1923 | Saxe | 15/172 |
| 1,651,251 | 11/1927 | Calkins | 15/172 |
| 2,047,485 | 7/1936 | McBrady | 16/115 |
| 2,112,349 | 3/1938 | Schumacher | 15/172 |
| 3,000,029 | 9/1961 | Wood | 15/172 |
| 3,407,424 | 10/1968 | Lazarone et al. | 16/115 |
| 3,916,470 | 11/1975 | May | 15/98 |
| 4,247,216 | 1/1981 | Pansini | 15/144 R |
| 4,385,849 | 5/1983 | Crain | 403/109 |

FOREIGN PATENT DOCUMENTS

| | | | |
|---|---|---|---|
| 0023407 | 4/1981 | European Pat. Off. | 15/172 |
| 77787 | 5/1918 | Switzerland | 15/172 |

*Primary Examiner*—Harvey C. Hornsby
*Assistant Examiner*—Christine A. Peterson
*Attorney, Agent, or Firm*—John J. Posta, Jr.

[57] ABSTRACT

The pool cleaning pole assembly includes an elongated cleaning pole having an improved adapter releasably connected to the bottom cleaning end thereof, and a cleaning accessory releasably connected to the adapter. The adapter includes (a) a first member having an upper hollow tubular portion releasably connected in the pole lower end by spring biased pins and bearing a base below the pole, and (b) a second member rotatably secured to the underside of the base for limited rotation. The second member has a bracket to which a pool cleaning accessory such as a brush, vacuum head, etc., is releasably connected. The adapter also includes a pin or the like inserted in aligned openings in the base and second member and connected to a Bowden wire or push rod passing up through the hollow tubular member and pole to the pole's upper end where it can be easily moved up and down by the operator to lock the second member against rotation or free it to rotate. Alternatively, the locking device may be clamp operated by the wire or rod. The adapter and assembly are efficient, inexpensive and durable.

5 Claims, 2 Drawing Sheets

ADAPTER AND POLE ASSEMBLY

BACKGROUND OF THE INVENTION

1. Field of the Invention

The present invention generally relates to pool cleaning equipment and, more particularly, to a pool cleaning pole bearing an improved adapter for pool cleaning accessories.

2. Prior Art

There are many types of swimming pool cleaning equipment, because of the extensive use of pools of various sizes and shapes and the need to keep them clean for sanitary and cosmetic purposes. Certain companies offer periodic pool cleaning services to homeowners, businesses, etc. Pool cleaning personnel must clean rapidly and thoroughly in order to make their operations profitable. There, therefore, is a need for equipment which will facilitate improved cleaning speed and thoroughness.

The basic pool cleaning tool is a large pole, to which one or more pool cleaning accessories, such as brushes, vacuum heads, nets, etc., are permanently or releasably connected. It has been found desirable for certain cleaning operations to be able to rotate the cleaning equipment at the end of the pole, while other operations demand fixed position cleaning equipment. However, it is time consuming to have to stop and change rotatable to non-rotatable equipment and vice verse, as the need arises.

Accordingly, there is a need for versatile and efficient pool cleaning equipment which will eliminate having to exchange rotatable and non-rotatable cleaning brushes, etc., at the lower cleaning end of the cleaning pole. There is a further need to be able to control the rotatability of such equipment at the top end of the pole; that is, the end held by the operator, rather than having to have the entire length of the pole to reach the lower cleaning end in order to make such adjustments.

SUMMARY OF THE INVENTION

The improved cleaning pole assembly and adapter of the present invention satisfy all the foregoing needs. Thus, the assembly includes an elongated hollow tubular pole with the adapter releasably held in the lower cleaning end thereof, as by spring biased pins and the adapter releasably holding a cleaning brush, head, etc.

The adapter includes a tubular upper portion connected to an angled base so that the cleaning accessory is at an angle to the pole; for example, a 15° angle to facilitate the cleaning operation. To the bottom of the base is rotatably secured a second member releasably bearing the cleaning brush or the like connected by spring biased pins, etc. The extent of rotation of the second member around the base is limited to an arc of, for example, 45°, by suitable means, such as the length of travel of one or more studs or lug of the second member in a semi-circular groove or track in the base.

The base and second member can be releasably locked together to prevent rotation of the latter. This is accomplished by a pin passing through aligned holes in the base and second member and connected by a Bowden wire, stiff rod or the like running to the top of the pole, so that the pin can be pulled from the second member to free it for rotation and later can be reinserted by manipulating the wire or rod. Alternatively, the wire or rod can manipulate a clamp fixed to the base and having a jaw movable in and out of immobilizing contact with the second member.

Thus, the operator need not grasp the lower end of the pole to immobilize or allow the cleaning equipment to rotate.

Further features of the improved assembly and adapter are set forth in the following detailed description and accompanying drawings.

DRAWINGS

DETAILED DESCRIPTION

FIGS. 1–6

Figure 1:
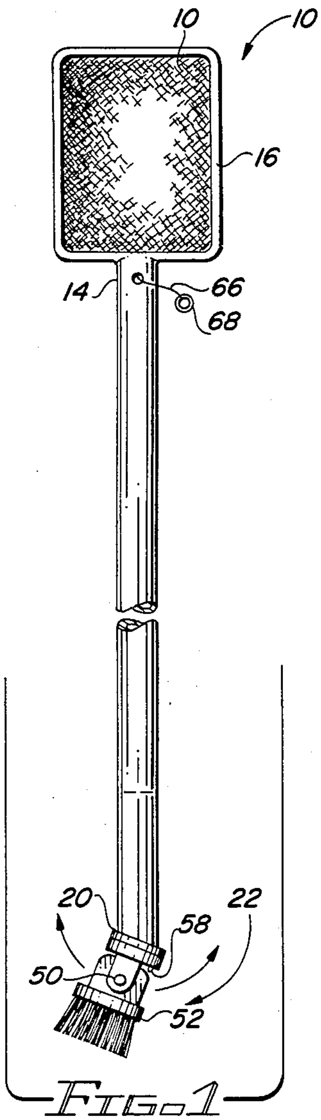
FIG. 1 is a fragmentary, schematic side elevation of a first preferred embodiment of the improved pool cleaning pole assembly of the present invention.
Figure 2:
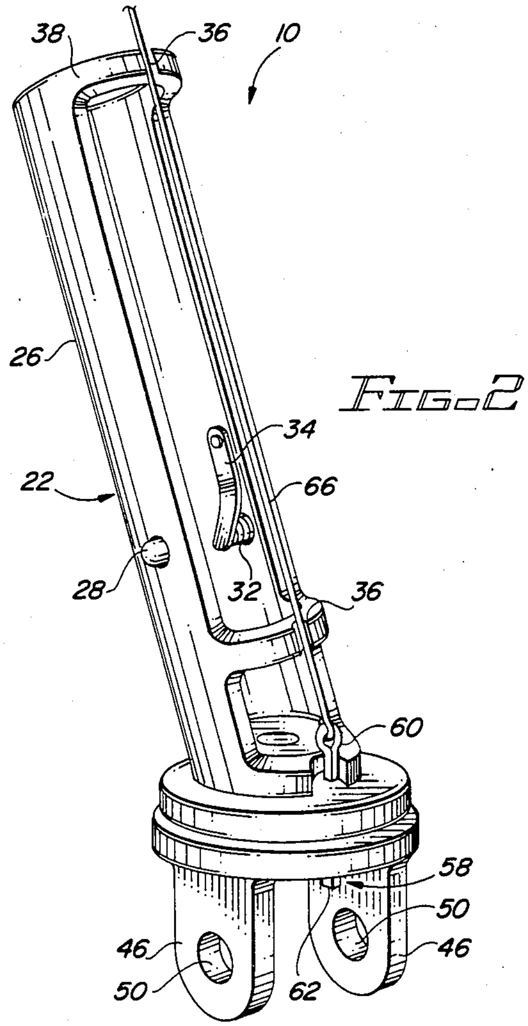
FIG. 2 is an enlarged schematic perspective view of the adapter of FIG. 1.

Now referring more particularly to FIGS. 1–6 of the drawings, a first preferred embodiment of the improved pool cleaning pole assembly of the present invention is schematically depicted therein. Thus, assembly 10 is shown which comprises an elongated hollow preferably cylindrical pole 12 of metal or the like, with the upper end 14 thereof fitted with a handle 16 in the form of a net 18 and with the lower end 20 thereof fitted with an improved adapter 22.

Figure 3:
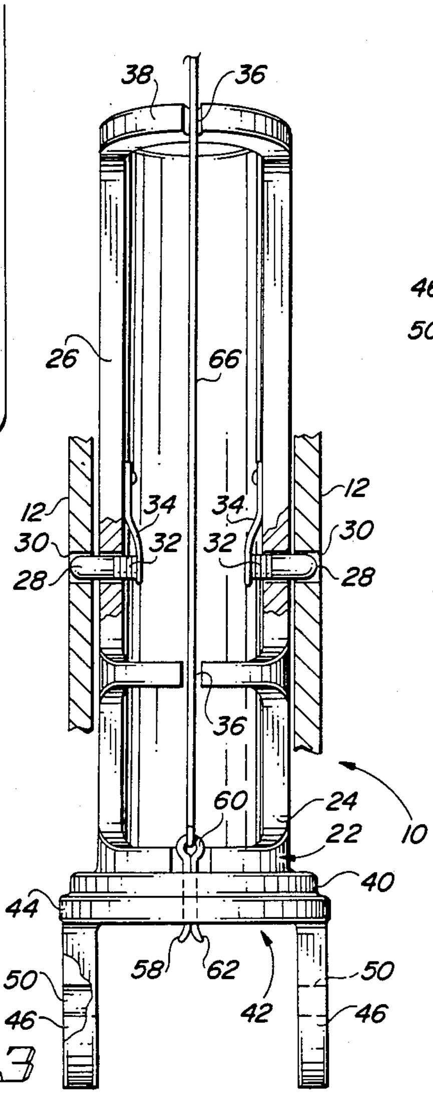
FIG. 3 is an enlarged schematic front elevation, partly broken away of the adapter of FIG. 2 in the pole of FIG. 1.
Figure 4:
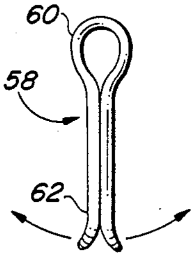
FIG. 4 is an enlarged schematic front elevation of the pin of FIG. 3.
Figure 5:
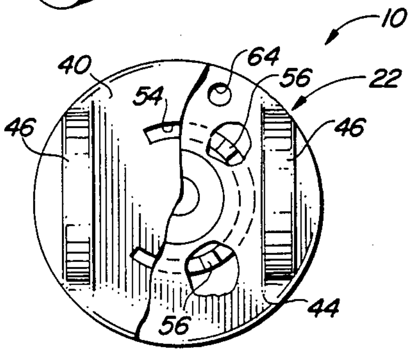
FIG. 5 is an enlarged schematic bottom plan view, partly broken away, of the second member and base of the adapter of FIG. 1.
Figure 6:
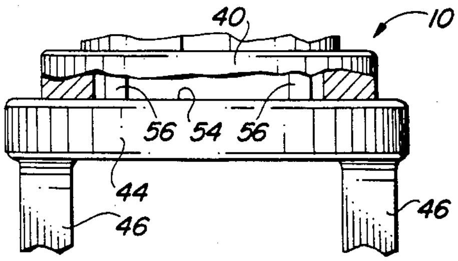
FIG. 6 is an enlarged schematic side elevation, partly broken away, of the base and second member of FIG. 5.

Adapter 22 comprises a first member 24 having an elongated tubular upper portion 26 releasably secured in end 20, as by a pair of pins 28 extending radially outwardly therefrom and into radial openings 30 in end 20 (FIG. 3), being biased by coil springs 32 backed by leaf springs 34 in portion 26. Portion 26 may be partly cut away, as shown in FIG. 3, to provide a spaced pair of guide channels 36 for purposes described below.

Portion 26 has a closed top 38 and an integral expanded, closed circular base 40 set on at an angle, for example, 15°–25°, to the remainder of portion 26, the bottom of which base 40 is rotatably secured a second member 42 of adapter 22 disposed in the same angled position. Member 42 has a circular upper portion 44 and a spaced pair of depending legs 46 bearing transverse holes 45 releasably receiving connector pins 50 of a cleaning accessory such as a brush 52 (FIG. 1), so that brush 52 is also at an angle of inclination from that of pole 12, making it easy to use brush 52 by manipulating pole 12.

The extent of rotation of member 42 may be limited. For example, such rotation may be only through an angle of 45° to prevent brush 52 from spinning around uncontrollably. Such limited rotation is effected by any suitable means. For example, one of the upper end of portion 44 and the lower end of base 40 can have a semi-circular groove or track 54 therein (FIG. 5) while the other of these two components has one or a plurality of spaced studs or lugs 56 disposed in groove 54. When one of studs 56 strikes the end of groove 54 during rotation on a given direction, rotation in that direction is terminated.

Adapter 22 also includes means for totally but releasably immobilizing member 42 to prevent its rotation. Such means may comprise a pin 58 having a loop 60 at its top and one or a pair of depending legs 62 releasably disposed in aligned holes 64 in base 40 and portion 44 of member 42 to fully immobilize member 42. Pin 58 is connected to a conventional Bowden wire or the like 66 at loop 60, which wire 66 passes up channels 36 in adapter 22 and in pole 12 to exit pole 12 at end 14 and form a full loop 68. Bowden wires are usually flexible, strong wires carried in flexible cables and normally are used to remotely control objects such as toys, camera shutters, etc. They are well known and easily adapted for use therein.

When wire 66 is pulled up by loop 68 by the operator holding pole 12, pin 58 is pulled up out of hole 64 in portion 44, allowing member 42 to rotate with brush 52, subject to the limits enforced by studs 58 in groove 54. Pin 58 is left in base 40 so that it can be pushed down into portion 54 when holes 64 are once more aligned while sliding wire 66 down pole 12. To achieve such alignment, brush 52 can be slowly rotated against an object. Accordingly, brush 52 can rotate or not as the cleaning operation demands, all without having to have the operator grasp the brush end of pole 12. Therefore, assembly 10 has improved utility over conventional devices and is simple, durable and efficient. It will be understood that the components of assembly 10 can be made of metal and/or plastic and/or rubber, or the like and that various cleaning attachments such as sponges, mops, vacuum heads, etc., can be used in place of brush 52.

FIG. 7

Figure 7:
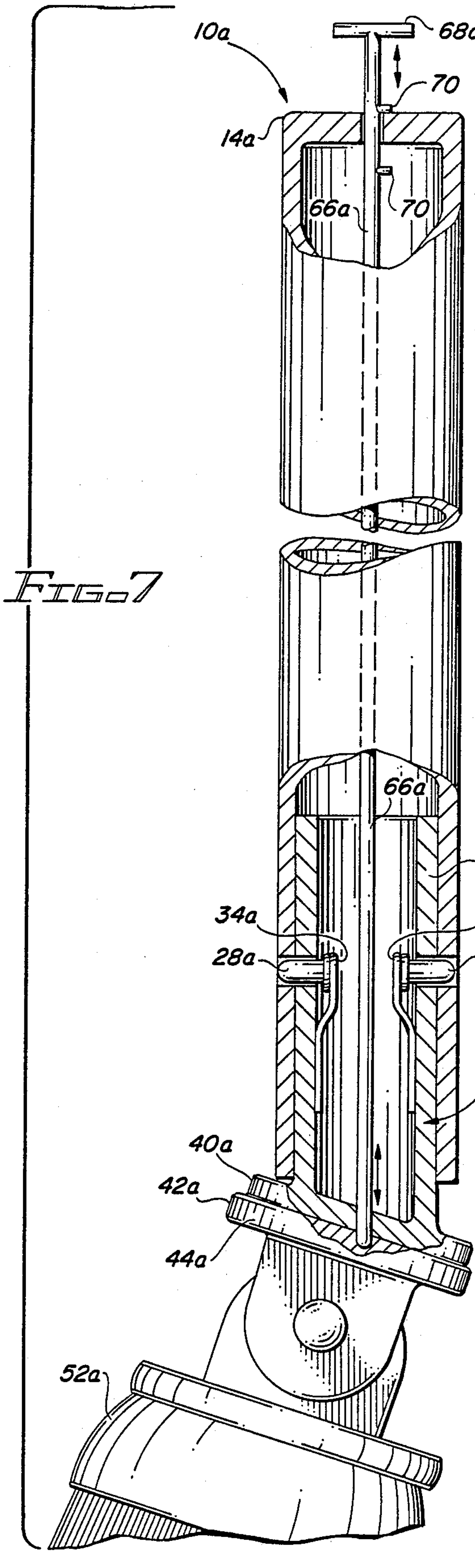
FIG. 7 is a schematic fragmentary side elevation, partly broken away and partly in section, of a second preferred embodiment of the improved assembly of the present invention; and, FIG. 8 is a schematic fragmentary side elevation, partly broken away, of a third preferred embodiment of the improved assembly of the present invention.

A second preferred embodiment of the improved assembly and adapter of the present invention is schematically depicted in FIG. 7. Thus, assembly **10*a* is shown. Components thereof similar to those of assembly 10 bear the same numerals, but are succeeded by the letter "a". Assembly 10*a* is identical to assembly 10**, except as follows:

(a) pins **28*a* are biased only by leaf springs 34*a*;**

(b) a stiff control rod **66*a* bearing limit studs 70 runs down the center of pole 12*a* and adapter tube portion 26*a* to base 40*a* and portion 44*a*, portion 26*a*** being topless;

(c) pole upper end **14*a* bears no implement such as net 18, while lower end of assembly 10 comprises an internally powered brush 52*a*.**

Assembly **10*a* has the advantages of assembly 10**.

FIG. 8

Figure 8:
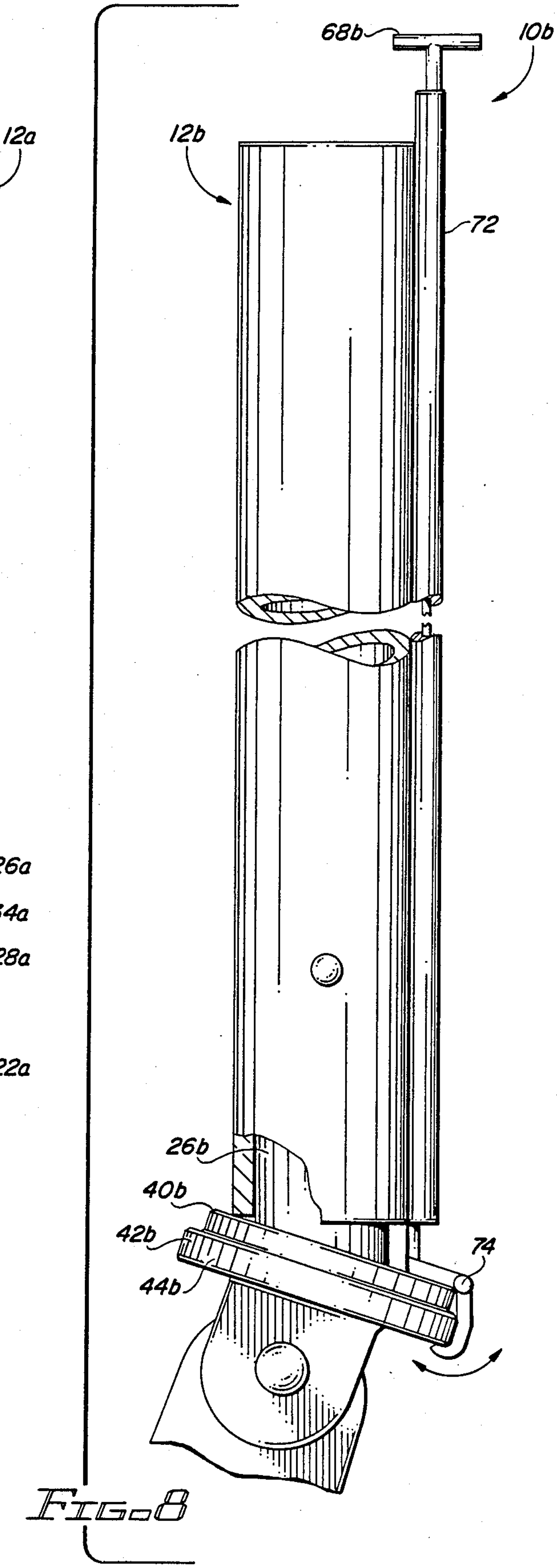

A third preferred embodiment of the improved assembly and adapter of the present invention is schematically depicted in FIG. 8. Thus, assembly **10*b* is shown. Components thereof similar to those of assembly 10 or 10*a* bear the same numerals, but are succeeded by the letter "b". Assembly 10*b* is identical to assembly 10*a* except that a Bowden wire 66*b* bearing a handle 68*b* is disposed in a tube 72 connected to the outside of pole 12*b* and the top of base 40*b* as shown in FIG. 8. Wire 66*b* connects to and manipulates a clamp 74, the upper portion of which is secured to the top of base 40*b* and the lower jaw 76 of which is L-shaped and releasably clamps portion 44*b* of member 42*b* against rotation below base 40*b*.**

Assembly **10*b* has substantially the advantages of assemblies 10 and 10*a*.**

Further modifications, changes, alterations and additions can be made in the improved assembly and adapter of the present invention, their components and parameters. All such modifications, changes, alterations and additions as are within the scope of the appended claims form part of the present invention.

What is claimed is:

1. An improved adapter for a pool cleaning pole, said adapter comprising, in combination:

(a) a first member comprising
  1. a generally vertically extending cylindrical hollow tubular portion, said hollow tubular portion bearing first releasable connection means for releasable connection thereof to the inside of a pool cleaning pole, and
  2. a substantially flat base portion lying in a substantially horizontal plane;

(b) a second member having
  1. a flat portion lying generally in a plane substantially parallel to the plane of said base portion, and
  2. a second releasable connection means for releasable connection of pool cleaning accessories to said second member;

(c) pivot means rotatably interconnecting said base portion and said flat portion, and (d) locking means for releasably securing said flat portion and said base portion together to prevent relative rotation thereof, (e) wherein said limit means comprises one of a pin releasably disposed in alignable openings in said base portion and said flat portion and a clamp fixed to said base portion and releasably clampable to said flat portion and remote actuating means connected to said pin or clamp for releasably remotely withdrawing said pin or clamp from said flat portion.

2. The improved adapter of claim 1 wherein said remote actuating means comprises one of a Bowden wire and a stiff rod connected to said pin or clamp and passing up past the upper end of said hollow tubular portion for movement thereof by an operator while holding the top end of a pool cleaning pole, in the bottom of which said adapter is inserted.

3. The improved adapter of claim 2 wherein said hollow tubular portion includes guide means for said actuating means.

4. The improved adapter of claim 3 wherein said guide means comprise a longitudinal channel in the outer surface of said hollow tubular portion.

5. An improved adapter for a pool cleaning pole, said adapter comprising, in combination:

(a) a first member comprising
  1. a generally vertically extending cylindrical hollow tubular portion, said hollow tubular portion bearing first releasable connection means for releasable connection thereof of the inside of a pool cleaning pole, and
  2. a substantially flat base portion lying in a substantially horizontal plane;

(b) a second member having 1. a flat portion lying generally in a plane substantially parallel to the plane of said base portion, and
2. a second releasable connection means for releasable connection of pool cleaning accessories to said second member;

(c) pivot means rotatably interconnecting said base portion and said flat portion, and (d) locking means for releasably securing said flat portion and said base portion together to prevent relative rotation thereof, (e) wherein said locking comprises one of a pin extending through aligned openings in said base portion and flat portion and a clamp fixed to said base portion and clampable against said flat portion and one of a Bowden wire and a stiff rod connected to the upper end of said pin or clamp and to the upper end of said pole for movement by an operator.

* * * * *